United States Patent
Takada et al.

(12) 
(10) Patent No.: US 6,502,049 B1
(45) Date of Patent: Dec. 31, 2002

(54) USER'S COLOR MATCHING SYSTEM, THINNED PIGMENT DISPERSION SET FOR COLOR MATCHING, PAINT COLOR MATCHING METHOD, COLOR MATCHING DATA BASE FOR USER AND METHOD OF USING THE SAME

(75) Inventors: Hiromichi Takada, Aichi (JP); Kazuhiko Ide, Gifu (JP)

(73) Assignee: Kikusui Chemical Industries Co., Ltd., Nagoya (JP)

(*) Notice: Subject to any disclaimer, the term of this patent is extended or adjusted under 35 U.S.C. 154(b) by 0 days.

(21) Appl. No.: 09/452,383

(22) Filed: Dec. 1, 1999

(30) Foreign Application Priority Data

| Dec. 2, 1998 | (JP) | ............................................ 10-342433 |
| Dec. 21, 1998 | (JP) | ............................................ 10-361797 |
| Dec. 21, 1998 | (JP) | ............................................ 10-362015 |

(51) Int. Cl.$^7$ .................................................. G06F 7/02
(52) U.S. Cl. .................................... 702/104; 702/85
(58) Field of Search .................... 702/104, 85; 356/405, 356/402, 425; 364/526; 345/150; 395/131; 366/247

(56) References Cited

U.S. PATENT DOCUMENTS

| 2,540,797 A | | 2/1951 | Stearns, Jr. .................... 235/61 |
| 4,403,866 A | | 9/1983 | Falcoff et al. ................ 366/132 |
| 5,381,349 A | * | 1/1995 | Winter et al. ................ 364/526 |
| 5,465,104 A | * | 11/1995 | Munson ....................... 345/150 |
| 5,558,435 A | | 9/1996 | Marjo ......................... 366/141 |
| 5,583,642 A | * | 12/1996 | Nakazono .................... 356/405 |
| 5,668,633 A | * | 9/1997 | Cheetam et al. ............. 356/402 |
| 5,720,017 A | * | 2/1998 | Cheetam et al. ............. 395/131 |
| 5,726,910 A | * | 3/1998 | Toma .......................... 364/526 |
| 5,740,078 A | * | 4/1998 | Cheetam et al. ............. 364/526 |
| 5,841,421 A | * | 11/1998 | Cheetam et al. ............. 345/150 |
| 6,058,357 A | * | 5/2000 | Granger ....................... 702/104 |
| 6,108,095 A | * | 8/2000 | Graf ............................ 356/425 |
| 6,146,009 A | * | 11/2000 | Boers .......................... 366/247 |

FOREIGN PATENT DOCUMENTS

| EP | 0 131 414 | 1/1985 |
| EP | 0 165 097 | 12/1985 |
| EP | 0 484 564 A1 | 5/1992 |
| FR | 2 698 982 | 6/1994 |
| GB | 2 192 455 | 1/1988 |
| JP | 56-163600 | 12/1981 |
| JP | 2-184369 | 7/1990 |
| JP | 02282699 PN | 12/1990 |
| JP | 6-279716 | 10/1994 |

* cited by examiner

Primary Examiner—Marc S. Hoff
Assistant Examiner—Felix Suarez
(74) Attorney, Agent, or Firm—Oblon, Spivak, McClelland, Maier & Neustadt, P.C.

(57) ABSTRACT

A user of a colored paint is made to have an inexpensive color matching device having the least measuring and mixing functions, and a maker of a colored paint offers the user a base paint, a thinned pigment dispersion for rough color matching and a thinned pigment dispersion for fine color matching and a data indicating mixing amounts of them in terms of a unit which is easy to calculate, and further offers him a correction data of mixing amounts in consideration of seasonal factors or environmental factors as required.

12 Claims, 4 Drawing Sheets

FIG. 3

DISPENSER VOLUME DATA TABLE

May 26, 1998 (Tuesday)  Temperature: 18°C
Humidity: 80%
Weather: fine

| Pigment | Pump | Scale (ml) | 1st | 2nd | 3rd | 4th | 5th | Average value | Corrected value |
|---|---|---|---|---|---|---|---|---|---|
| Black | pigment dispersion, large | 40.0 | 46.94 | 46.93 | 46.92 | 46.95 | 46.92 | 46.93 | 1.1733 |
| | pigment dispersion, small | 4.0 | 4.72 | 4.68 | 4.68 | 4.70 | 4.68 | 4.69 | 1.1730 |
| | dilute solution, large | 40.0 | 40.92 | 40.94 | 40.93 | 40.92 | 40.91 | 40.92 | 1.0231 |
| | dilute solution, small | 4.0 | 4.08 | 4.10 | 4.11 | 4.07 | 4.09 | 4.09 | 1.0225 |

| Pigment | Pump | Scale (ml) | 1st | 2nd | 3rd | 4th | 5th | Average value | Corrected value |
|---|---|---|---|---|---|---|---|---|---|
| Rust | pigment dispersion, large | 40.0 | 69.56 | 69.51 | 69.56 | 69.54 | 69.52 | 69.54 | 1.7385 |
| | pigment dispersion, small | 4.0 | 6.99 | 6.99 | 6.99 | 6.95 | 6.96 | 6.98 | 1.7440 |
| | dilute solution, large | 40.0 | 41.16 | 41.19 | 41.17 | 41.17 | 41.18 | 41.17 | 1.0294 |
| | dilute solution, small | 4.0 | 4.11 | 4.12 | 4.11 | 4.10 | 4.08 | 4.10 | 1.0260 |

| Pigment | Pump | Scale (ml) | 1st | 2nd | 3rd | 4th | 5th | Average value | Corrected value |
|---|---|---|---|---|---|---|---|---|---|
| Ocher | pigment dispersion, large | 40.0 | 60.51 | 60.51 | 60.52 | 60.50 | 60.49 | 60.51 | 1.5127 |
| | pigment dispersion, small | 4.0 | 6.05 | 6.03 | 6.02 | 6.03 | 6.02 | 6.03 | 1.5075 |
| | dilute solution, large | 40.0 | 41.10 | 41.09 | 41.07 | 41.11 | 41.10 | 41.09 | 1.0274 |
| | dilute solution, small | 4.0 | 4.30 | 4.27 | 4.30 | 4.33 | 4.29 | 4.30 | 1.0745 |

| Pigment | Pump | Scale (ml) | 1st | 2nd | 3rd | 4th | 5th | Average value | Corrected value |
|---|---|---|---|---|---|---|---|---|---|
| Green | pigment dispersion, large | 40.0 | 48.00 | 47.99 | 47.99 | 48.01 | 47.99 | 48.00 | 1.1999 |
| | pigment dispersion, small | 4.0 | 4.85 | 4.86 | 4.88 | 4.87 | 4.86 | 4.86 | 1.2160 |
| | dilute solution, large | 40.0 | 40.31 | 40.35 | 40.33 | 40.29 | 40.33 | 40.32 | 1.0081 |
| | dilute solution, small | 4.0 | 4.06 | 4.05 | 4.04 | 4.03 | 4.06 | 4.04 | 1.0100 |

| Pigment | Pump | Scale (ml) | 1st | 2nd | 3rd | 4th | 5th | Average value | Corrected value |
|---|---|---|---|---|---|---|---|---|---|
| Blue | pigment dispersion, large | 40.0 | 43.58 | 43.57 | 43.58 | 43.57 | 43.57 | 43.57 | 1.0894 |
| | pigment dispersion, small | 4.0 | 4.35 | 4.40 | 4.36 | 4.39 | 4.38 | 4.38 | 1.0940 |
| | dilute solution, large | 40.0 | 40.68 | 40.66 | 40.69 | 40.71 | 40.70 | 40.69 | 1.0172 |
| | dilute solution, small | 4.0 | 4.11 | 4.09 | 4.08 | 4.10 | 4.07 | 4.12 | 1.0300 |

| Pigment | Pump | Scale (ml) | 1st | 2nd | 3rd | 4th | 5th | Average value | Corrected value |
|---|---|---|---|---|---|---|---|---|---|
| Red | pigment dispersion, large | 40.0 | 45.02 | 45.02 | 45.04 | 45.05 | 45.02 | 45.03 | 1.1258 |
| | pigment dispersion, small | 4.0 | 4.62 | 4.57 | 4.59 | 4.60 | 4.59 | 4.59 | 1.1485 |
| | dilute solution, large | 40.0 | 40.68 | 40.72 | 40.70 | 40.69 | 40.74 | 40.71 | 1.0178 |
| | dilute solution, small | 4.0 | 4.03 | 4.02 | 4.02 | 4.03 | 4.04 | 4.03 | 1.0070 |

| Pigment | Pump | Scale (ml) | 1st | 2nd | 3rd | 4th | 5th | Average value | Corrected value |
|---|---|---|---|---|---|---|---|---|---|
| Yellow | pigment dispersion, large | 40.0 | 43.46 | 43.42 | 43.43 | 43.44 | 43.44 | 43.44 | 1.0860 |
| | pigment dispersion, small | 4.0 | 4.36 | 4.37 | 4.36 | 4.36 | 4.35 | 4.36 | 1.0900 |
| | dilute solution, large | 40.0 | 40.90 | 40.88 | 40.87 | 40.91 | 40.92 | 40.90 | 1.0224 |
| | dilute solution, small | 4.0 | 4.21 | 4.25 | 4.24 | 4.21 | 4.25 | 4.23 | 1.0580 |

FIG. 4

DISPENSER VOLUME DATA TABLE

August 25, 1998 (Tuesday)                                Temperature: 24°C
                                                         Humidity: 90%
                                                         Weather: cloudy

| Pigment | Pump | Scale (ml) | 1st | 2nd | 3rd | 4th | 5th | Average value | Corrected value |
|---|---|---|---|---|---|---|---|---|---|
| Black | pigment dispersion, large | 40.0 | 46.62 | 46.64 | 46.60 | 46.63 | 46.63 | 46.62 | 1.1656 |
| | pigment dispersion, small | 4.0 | 4.65 | 4.67 | 4.65 | 4.65 | 4.67 | 4.66 | 1.1645 |
| | dilute solution, large | 40.0 | 40.55 | 40.52 | 40.51 | 40.56 | 40.52 | 40.53 | 1.0133 |
| | dilute solution, small | 4.0 | 4.11 | 4.12 | 4.11 | 4.09 | 4.12 | 4.11 | 1.0275 |

| Pigment | Pump | Scale (ml) | 1st | 2nd | 3rd | 4th | 5th | Average value | Corrected value |
|---|---|---|---|---|---|---|---|---|---|
| Rust | pigment dispersion, large | 40.0 | 70.40 | 70.45 | 70.45 | 70.40 | 70.41 | 70.42 | 1.7606 |
| | pigment dispersion, small | 4.0 | 7.06 | 7.07 | 7.07 | 7.09 | 7.07 | 7.07 | 1.7680 |
| | dilute solution, large | 40.0 | 41.22 | 41.25 | 41.26 | 41.24 | 41.25 | 41.24 | 1.0311 |
| | dilute solution, small | 4.0 | 4.12 | 4.12 | 4.13 | 4.10 | 4.10 | 4.11 | 1.0285 |

| Pigment | Pump | Scale (ml) | 1st | 2nd | 3rd | 4th | 5th | Average value | Corrected value |
|---|---|---|---|---|---|---|---|---|---|
| Ocher | pigment dispersion, large | 40.0 | 60.65 | 60.61 | 60.66 | 60.65 | 60.63 | 60.64 | 1.5160 |
| | pigment dispersion, small | 4.0 | 6.05 | 6.04 | 6.06 | 6.06 | 6.06 | 6.05 | 1.5135 |
| | dilute solution, large | 40.0 | 41.11 | 41.12 | 41.09 | 41.14 | 41.15 | 41.12 | 1.0281 |
| | dilute solution, small | 4.0 | 4.42 | 4.43 | 4.41 | 4.41 | 4.43 | 4.42 | 1.1050 |

| Pigment | Pump | Scale (ml) | 1st | 2nd | 3rd | 4th | 5th | Average value | Corrected value |
|---|---|---|---|---|---|---|---|---|---|
| Green | pigment dispersion, large | 40.0 | 48.53 | 48.55 | 48.56 | 48.55 | 48.57 | 48.55 | 1.2138 |
| | pigment dispersion, small | 4.0 | 4.88 | 4.87 | 4.91 | 4.92 | 4.91 | 4.90 | 1.2245 |
| | dilute solution, large | 40.0 | 40.72 | 40.72 | 40.75 | 40.71 | 40.77 | 40.73 | 1.0184 |
| | dilute solution, small | 4.0 | 4.07 | 4.09 | 4.06 | 4.09 | 4.09 | 4.08 | 1.0200 |

| Pigment | Pump | Scale (ml) | 1st | 2nd | 3rd | 4th | 5th | Average value | Corrected value |
|---|---|---|---|---|---|---|---|---|---|
| Blue | pigment dispersion, large | 40.0 | 44.64 | 44.67 | 44.66 | 44.66 | 44.64 | 44.65 | 1.1164 |
| | pigment dispersion, small | 4.5 | 4.53 | 4.48 | 4.52 | 4.49 | 4.51 | 4.51 | 0.9969 |
| | dilute solution, large | 40.0 | 40.68 | 40.72 | 40.66 | 40.71 | 40.69 | 40.69 | 1.0173 |
| | dilute solution, small | 4.0 | 4.15 | 4.12 | 4.10 | 4.12 | 4.15 | 4.13 | 1.0320 |

| Pigment | Pump | Scale (ml) | 1st | 2nd | 3rd | 4th | 5th | Average value | Corrected value |
|---|---|---|---|---|---|---|---|---|---|
| Red | pigment dispersion, large | 40.0 | 44.93 | 44.91 | 44.88 | 44.90 | 44.88 | 44.90 | 1.1225 |
| | pigment dispersion, small | 4.0 | 4.52 | 4.54 | 4.54 | 4.52 | 4.53 | 4.53 | 1.1325 |
| | dilute solution, large | 40.0 | 40.66 | 40.69 | 40.66 | 40.69 | 40.64 | 40.67 | 1.0167 |
| | dilute solution, small | 4.0 | 4.01 | 4.02 | 4.00 | 4.04 | 4.03 | 4.02 | 1.0050 |

| Pigment | Pump | Scale (ml) | 1st | 2nd | 3rd | 4th | 5th | Average value | Corrected value |
|---|---|---|---|---|---|---|---|---|---|
| Yellow | pigment dispersion, large | 40.0 | 43.90 | 43.87 | 43.90 | 43.91 | 43.91 | 43.90 | 1.0975 |
| | pigment dispersion, small | 4.0 | 4.41 | 4.41 | 4.42 | 4.43 | 4.41 | 4.42 | 1.1040 |
| | dilute solution, large | 40.0 | 41.02 | 41.04 | 41.05 | 41.00 | 41.04 | 41.03 | 1.0258 |
| | dilute solution, small | 4.0 | 4.32 | 4.35 | 4.35 | 4.31 | 4.33 | 4.33 | 1.0830 |

USER'S COLOR MATCHING SYSTEM, THINNED PIGMENT DISPERSION SET FOR COLOR MATCHING, PAINT COLOR MATCHING METHOD, COLOR MATCHING DATA BASE FOR USER AND METHOD OF USING THE SAME

BACKGROUND OF THE INVENTION

1. Field of the Invention

The present invention relates to a user's color matching system that enables a user of a colored paint himself to precisely match a color of a paint under predetermined conditions in cooperation with a maker, a thinned pigment dispersion for color matching used in this system, a paint color matching method, a color matching data base for enabling a user to conduct such a color matching, and a method of using the same.

2. Description of the Related Art

Since colored paint users selectively use color paints having various hues, it is impossible for them to have always all of these paints. For this reason, users have generally indicated colored paints of desired hues on the basis of color samples whenever they use the same, and have ordered the same to colored paint makers. Makers have in turn produced colored paints by mixing a base paint called a white paint base with pigment dispersions according to specific recipes, and have delivered the same to users.

However, in such a delivery system of colored paints, it takes a predetermined time for users or makers to do office works of giving or receiving an order and delivering products. Accordingly, at least 24 hours are actually required from ordering to completion of delivery. Thus, during that time, users are compelled to wait.

Under these circumstances, in recent years, users have come to require that base paints, various pigment dispersions and color matching devices (for example, a measuring device and a mixing stirrer) are provided in their own shops and they themselves conduct production of colored paints (color matching of base paints) freely and quickly.

However, such a color matching of users is currently problematic in the following three points a) to c).

a) There is no expert worker of the color matching on the side of users. Therefore, even when color samples are offered from makers or a color matching technical know-how is instructed from makers, it is impossible for users themselves to precisely match a color on the basis of the correct judgement of color hues.

b) In order to match a color of a base paint as required, it is requested to conduct precise mixing (especially, a small amount of a pigment dispersion is measured precisely and stably in terms of a very small unit calculated below the decimal point, for example, "7.15 ml", and mixed). To this end, a costly high-precision color matching device and a color matching worker, a skilled person who precisely conducts the measuring process, are needed. However, such a color matching device and the skilled worker cannot be expected from users.

Some paint makers have tried to supply a pigment dispersion in which the pigment concentration is decreased to approximately 10 times on purpose for diminishing the users' difficulty in precise procedures of measuring and mixing the same. In this case, however, a base paint is mixed with a large amount of a pigment dispersion having a solvent formulation which is not necessarily adapted to base paints having various solvent formulations. Thus, there is a fear that a performance of paint might be decreased.

c) Even though the problems a) and b) are solved, an error in the color matching occurs with a known mixing ratio when, for example, a predetermined amount of a base paint is mixed with a predetermined volume of a pigment dispersion because an amount of a pigment dispersion to be used varies depending on the increase or the decrease in the volume of the pigment dispersion owing to environmental factors. Thus, it is quite impossible to correct the same at the users' technical level.

By the way, the present inventors have supposed that the foregoing problems could be solved by focussing on the following points x) to z).

x) The problem a) can be solved such that the know-how of the color matching operation which has been so far conducted by makers mainly based on experiences of expert workers is inputted in a data base, and offered to users as a figured color-matching data base.

y) The problem b) can be solved as follows. Users are made to install a relatively simple and inexpensive color-matching device. Further, with respect to the lack of precise measurement and the lack of skill in operation of the device, there is provided a color matching method using a combination of rough color matching with a pigment dispersion having a high thinned pigment concentration in which the concentration is precisely controlled through dilution with an average solution for pigment dilution that is most appropriate to base paints having various compositions and fine color matching with a thinned pigment dispersion having a low pigment concentration in which the concentration is likewise controlled.

z) The problem c) can be solved by correcting a data base, as required, by a correction formula in consideration of the change in the specific gravity owing to environmental factors of a thinned pigment dispersion using data accumulated abundantly by makers.

SUMMARY OF THE INVENTION

It is an object of the invention to provide, upon solving these problems, a user's color matching system which enables a user to match a color easily and precisely and which can avoid the decrease in the performance of a paint caused by color matching, a thinned pigment dispersion set for color matching that a user uses in this system, a paint color matching method which is conducted by a user using this thinned pigment dispersion set for color matching, a color matching data base for user and a using method including correction of the data.

The first aspect of the invention is that a user's color matching system in which a user of a colored paint himself matches a color of a base paint using a thinned pigment dispersion for color matching under the following conditions (1) to (3).

(1) The user has a color matching device capable of conducting measuring and mixing for color matching.

(2) The maker of the colored paint offers the user the base paint and the thinned pigment dispersion for color matching of a required hue.

(3) The maker of the colored paint offers the user a color matching data base for user that indicates a standard amount of a base paint in color matching and an amount of a thinned pigment dispersion for color matching of one or more hues to be mixed therewith in any mode.

In the first aspect, a color matching device capable of conducting measuring and mixing for color matching but not required to have a high precision can be bought or rent by a user without difficulty because it is relatively inexpensive.

A combination of a base paint and a thinned pigment dispersion for color matching is offered from a maker of a colored paint, and a standard amount of a base paint and an amount of a thinned pigment dispersion for color matching to be mixed therewith are further instructed using a color matching data base. Consequently, a user can mix them in amounts instructed by a maker and conduct the color matching without trouble even though a user cannot make mature judgement of a color tone in the color matching.

The second aspect of the invention is a thinned pigment dispersion set for color matching in which a thinned pigment dispersion of any hue comprises a thinned pigment dispersion for rough color matching and a thinned pigment dispersion for fine color matching as described below, at a pigment concentration ratio of from 5:1 to 50:1 which are used for color matching of a base paint:

(1) a thinned pigment dispersion for rough color matching having a high pigment concentration, which is a pigment dispersion produced for color matching of a base paint, or a thinned pigment dispersion obtained by diluting this pigment dispersion to a known concentration at a relatively low ratio with a colorless transparent solution for pigment dilution containing one or more of HEC (hydroxyethyl cellulose), a polycarboxylate and xanthan gum as a thickener and an alkylene glycol as a drying inhibitor; and (2) a thinned pigment dispersion for fine color matching having a low pigment concentration, which is obtained by diluting a pigment dispersion to a known concentration at a relatively high ratio with the solution for pigment dilution.

In the second aspect, the solution for pigment dilution has a good pigment dispersibility and an excellent adaptability to various base paint formulations. Accordingly, it has, on the average, the lowest adverse effect on the performance of the paint with respect to the base paint having various solvent formulations, and can remarkably avoid the deterioration of the performance of the paint.

The third aspect of the invention is a paint color matching method in which rough color matching of a base paint using the thinned pigment dispersion for rough color matching having the high pigment concentration in the large measuring unit and fine color matching of a base paint using the thinned pigment dispersion for fine color matching having the low pigment concentration in the measuring unit scaled up at the dilution ratio are conducted with respect to a thinned pigment dispersion of one or more hues in the color matching of a colored paint.

In the third aspect, even if a user has not a high-precision color matching device or there is not a skilled worker, the thinned pigment dispersion for rough color matching having the high pigment dispersion is used in a small amount in terms of a large measuring unit (for example, when it is requested to measure "7.15 ml" of the pigment dispersion, "7.0 ml" is measured with the ml unit"), and the thinned pigment dispersion for fine color matching having the low pigment concentration is used in a measuring unit scaled up at a dilution ratio (for example, "0.15 ml" is measured as "1.5 ml" scaled up to 10 times). Accordingly, the measuring and the mixing thereof can be conducted precisely. The same effects as provided in the second aspect can be expected.

The fourth aspect of the invention is a data base which is used in the color matching of the base paint by the user of the colored paint and in which at least the following data is offered for each desired color in the color matching:

(1) a standard amount of a base paint shown in terms of a weight unit or a volume unit; and (2) an amount of a thinned pigment dispersion for color matching of one or more hues shown in terms of a weight unit or a volume unit with respect to the base paint in the above-described standard amount.

In the fourth aspect, the base paint and the thinned pigment dispersion for color matching can be mixed in amounts indicated by the database, and the difficult judgement of color tones can be dispensed with on the users' side in which there is no expert worker of color matching.

The fifth aspect of the invention provides a method of using a color matching data base for user. In this method, when the standard amount of the base paint in the color matching data base for user is shown in terms of a weight unit and the mixing amount of the thinned pigment dispersion or the mixing amounts of the thinned pigment dispersion for rough color matching and the thinned pigment dispersion for fine color matching are shown in terms of a volume unit, the data of the mixing amount of the thinned pigment dispersion or the data of the mixing amounts of the thinned pigment dispersion for rough color matching and the thinned pigment dispersion for fine color matching are corrected, as required, by a correction formula in consideration of the change in the specific gravity of various thinned pigment dispersions owing to environmental factors, and the correction data is offered to the user.

In the fifth aspect, the color matching error accompanied by the increase or the decrease in the volume of the thinned pigment dispersion owing to environmental factors such as a temperature and the like can be corrected easily and accurately only by following the corrected value of the data base offered from the maker to the user as required.

The above and other advantages of the invention will become more apparent in the following description and the accompanying drawings.

BRIEF DESCRIPTION OF THE DRAWINGS

FIG. 3 is an example of a dispenser volume data table.

FIG. 4 is another example of a dispenser volume data table.

DETAILED DESCRIPTION OF THE INVENTION

[User's Color Matching System]

Figure 1:
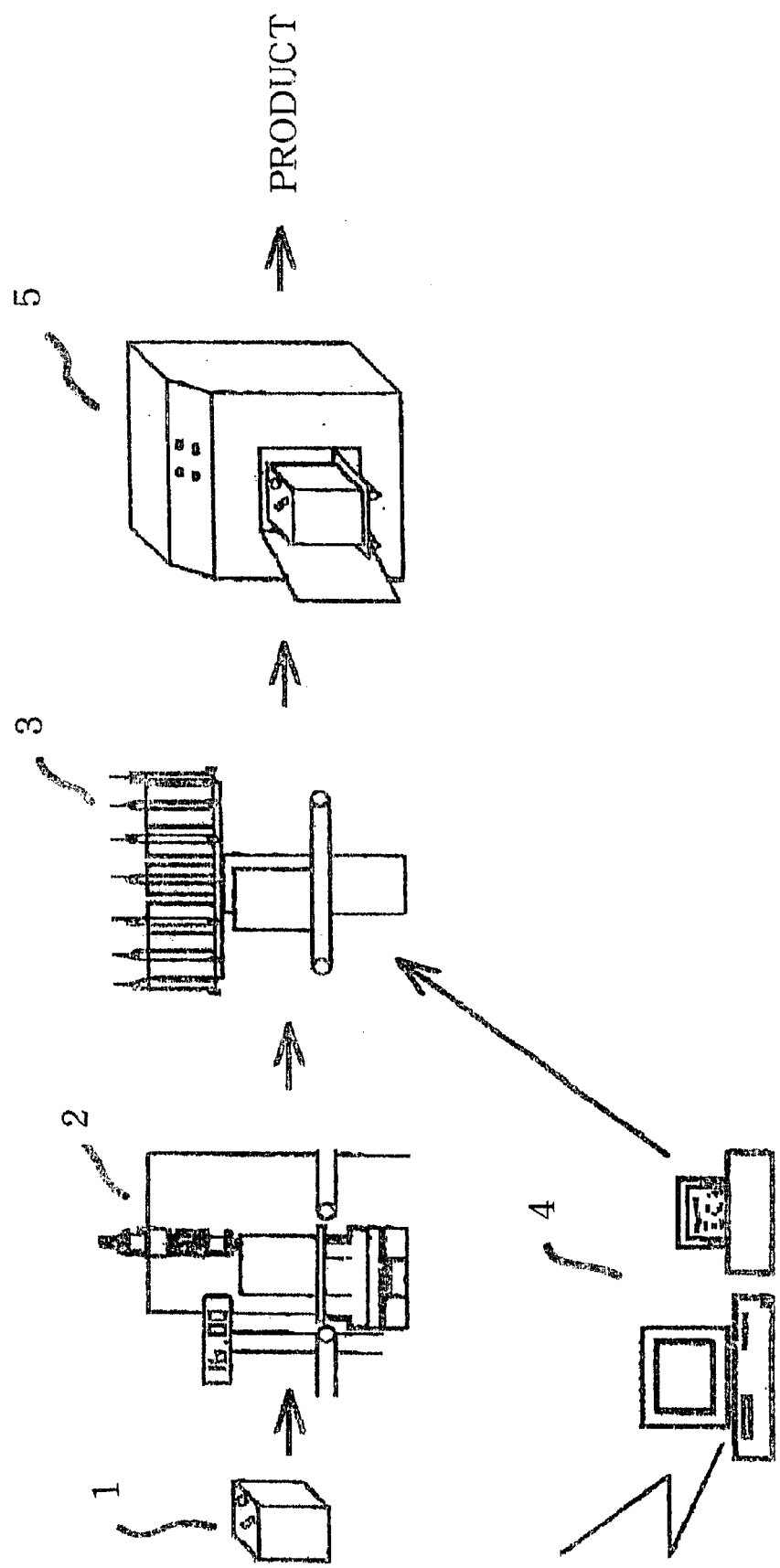
FIG. 1 is a view showing a structure of a color matching device used in Examples.

The user's color matching system according to the invention is a system that a user of a colored paint conducts himself the color matching of the base paint using a thinned pigment dispersion for color matching under the predetermined conditions.

The conditions are the following three.

(1) The user has a color matching device capable of conducting measuring and mixing for color matching.

(2) The maker of the colored paint offers the user the base paint and the thinned pigment dispersion for color matching of a required hue.

(3) The maker of the colored paint offers the user, in any mode, a matching data base for user that indicates a standard amount of a base paint in color matching and a mixing amount of a thinned pigment dispersion for color matching of one or more hues to be mixed therewith.

Incidentally, the "user" is not limited to a person who himself engages in coating work using a colored paint, but also includes a person who solely sells or supplies colored paints to paint dealers as final consumers.

[Solution for Pigment Dilution]

The solution for pigment dilution contains at least one or more of HEC, a polycarboxylate and xanthan gum as a thickener and an alkylene glycol as a drying inhibitor, making it possible to obtain the above-described excellent functions and effects.

The proportions of these components are not particularly limited. For example, the following can be mentioned.

| | |
|---|---|
| thickener | 0.5 to 5.0% by weight |
| drying inhibitor | 3.0 to 20.0% by weight |
| antiseptic | 0.1 to 1.0% by weight |
| fungicide | 0.1 to 1.0% by weight |
| water | 73.0 to 96.3% by weight |

As the thickener, HEC is especially preferable in view of the cost and the general-purpose property in comparison with starting materials used in other products. CMC (carboxymethyl cellulose) or MC (methyl cellulose) might cause troubles in water resistance or color formation of paints. The polyethylene oxide might cause pigment sedimentation owing to its low precipitation inhibiting property. So-called poval might decrease the water resistance. Bentonite might provide too high a thixotropy which is one viscosity.

Further, the alkylene glycol as the drying inhibitor (solvent) is especially preferably EG (ethylene glycol) Propylene glycol can also be used preferably. An excellent anti-freezing effect can be expected of EG too. Regarding other solvents, monoalcohol has a low effect of drying inhibition, and is problematic in the odor. Glycol ether is problematic in the odor, and might have an adverse effect on a film-formability of a coated film.

The solution for pigment dilution may contain other components, for example, an antiseptic and a fungicide unless the use purpose of the solution is impaired.

Further, the solution for pigment dilution is a colorless transparent solution. However, it is not necessarily a completely colorless transparent solution. It may be a solution which is colored or opaque to substantially a negligible extent when it is used in the color matching of the base paint as a dilute solution of a thinned pigment dispersion.

[Thinned Pigment Dispersion Set for Color Matching]

The thinned pigment dispersion set for color matching comprises a thinned pigment dispersion for rough color matching having a high pigment concentration and a thinned pigment dispersion for fine color matching having a low pigment concentration for each hue which are used in combination for color matching of the base paint.

With respect to the term "used in combination" here referred to, it is sufficient that the thinned pigment dispersion for rough color matching having the high pigment concentration and the thinned pigment dispersion for fine color matching having the low pigment concentration are used in combination in the color matching of the base paint. There is no need to deal with the same and the base paint as a set in production, selling or storage.

[Thinned Pigment Dispersion for Rough Color Matching and Thinned Pigment Dispersion for Fine Color Matching]

The thinned pigment dispersion for rough color matching is a pigment dispersion or a thinned pigment dispersion having a relatively high pigment concentration which is obtained by diluting the pigment dispersion to a known concentration at a relatively low ratio with a solution for pigment dilution. The thinned pigment dispersion for fine color matching is a thinned pigment dispersion having a relatively low pigment concentration which is obtained by diluting the pigment dispersion to a known concentration at a relatively high ratio with a solution for pigment dilution.

The relative pigment concentration ratio of the thinned pigment dispersion for rough color matching to the thinned pigment dispersion for fine color matching is basically not limited. It is preferably in the range of from 5:1 to 50:1 in view of the fact that the accurate color matching of the base paint and the retention of the paint performance are consistent. It is necessary to accurately adjust the pigment concentration ratio of the two dispersions. It is advisable that the ratio is provided in terms of an integral multiple.

The absolute pigment concentrations of the thinned pigment dispersion for rough color matching and the thinned pigment dispersion for fine color matching based on the pigment dispersion are not particularly limited. Usually, it is advisable that the pigment concentration of the thinned pigment dispersion for rough color matching is the same as that of the pigment dispersion, or from approximately a half to one-fifth that of the pigment dispersion by diluting the same with the solution for pigment dilution, and that the thinned pigment dilution for fine color matching is one obtained by further diluting the same to from 5 to 50 times the thinned pigment dispersion for rough color matching with the solution for pigment dilution.

[Pigment Color Matching Method]

The rough color matching of the base paint using the thinned pigment dispersion having the high pigment concentration and the fine color matching of the base paint using the thinned pigment dispersion having the low pigment concentration may be conducted over the course of time in this order or in reverse order, or simultaneously (the base paint is mixed with the thinned pigment dispersion for rough color matching and the thinned pigment dispersion for fine color matching simultaneously, or the amounts of both the thinned pigment dispersions are measured, these are then mixed, and the resulting mixture is mixed with the base paint).

This is because the amounts of the thinned pigment dispersion for rough color matching and the thinned pigment dispersion for fine color matching are measured to thereby secure the effect of accurately measuring the amounts of the pigments incorporated in the base paint, and the effect of eliminating the difficulty in the accurate color matching with only the solution having the high pigment concentration such as the pigment dispersion is equally secured in all the above-described cases without increasing so much the amount of the thinned pigment dispersion relative to the base paint.

In the pigment color matching method of the invention, rough color matching of a base paint using the thinned pigment dispersion for rough color matching having the high pigment concentration in the large measuring unit and fine color matching of a base paint using the thinned pigment dispersion for fine color matching having the low pigment concentration in the measuring unit scaled up at the dilution ratio are conducted with respect to a thinned pigment dispersion of one or more hues in the color matching of the colored paint.

Accordingly, on condition that the thinned pigment dispersion set for color matching is offered to the user, the data of the mixing amounts of these thinned pigment dispersions in the color matching data base for user are indicated by predetermined measuring units in terms of the weight unit or the volume unit. The user has only to measure the thinned pigment dispersion for rough color matching and the thinned pigment dispersion for fine color matching according to the data of the mixing amounts and to mix the same. Thus, the user can accurately match the color of the base paint quite easily.

In this method, the rough color matching (for roughly arranging the color tone) is conducted with a large measuring unit (e.g. 7.0 mL) rather than a small measuring unit (e.g. 7.15 mL). So the accurate measurement and mixing is possible without a high-precision device or a skilled worker.

In this method, the fine color matching (for arranging the accurate color tone) is conducted with the measuring unit scaled up at a dilution ratio. Usually, in this case, if a high-precision color matching device is lacking or an expert worker is absent, a certain measuring error would be unavoidable. In this method, however, quite accurate color matching can be secured for the following two reasons (1) and (2).

(1) Since the fine color matching is conducted with the dispersion having the low pigment concentration within such a range that the rough color matching is accurately defined, the deviation of the color matching due to the measuring error is by far less than that of the color matching due to the measuring error of the pigment dispersion itself in the ordinary technique.

(2) In addition, the measuring unit of the dispersion having the low pigment concentration itself is scaled up at the dilution ratio. Therefore, even when a high-precision color matching device is lacking and an expert worker is absent, the accurate measuring can be expected as compared with the ordinary technique.

Since the fine color matching is conducted within the range of the rough color matching with the thinned pigment dispersion (small amount) for rough color matching, the thinned pigment dispersion for fine color matching is used in a small amount, and the total mixing amount of the thinned pigment dispersions (for rough and fine color matching) is reduced. Besides, the thinned pigment dispersion for fine color matching is prepared using the solution for pigment dilution. Accordingly, the decrease in the performance of the paint by the mixing with the thinned pigment dispersions or the deviation from the range of the designing property is reduced to a substantially negligible extent.

These effects are further described specifically. For example, when it is required to conduct color matching by accurately measuring an amount of a thinned pigment dispersion corresponding to "7.15 ml" of a pigment dispersion based on a base paint and mixing the same, an error is increased in measuring the amount of the pigment dispersion unless using an expensive high-precision color matching device. Thus, the color matching is quite inaccurate.

Meanwhile, when a commercial pigment dispersion in which a pigment concentration has been reduced to 1/10 is used as described above, the amount becomes "71.5 ml", and the measuring unit is scaled up by 10 times. Thus, the measuring accuracy is increased in this case. However, since such a commercial pigment dispersion is usually not adapted to a formulation of a base paint to be actually used, it is unescapable to decrease the performance of the base paint by incorporation of the large amount of the pigment dispersion.

However, according to the invention, when the pigment concentration ratio of the thinned pigment dispersion for rough color matching and the thinned pigment dispersion for fine color matching is, for example, 40:1, it is sufficient that the amount of the thinned pigment dispersion for rough color matching is measured to be "7.0 ml" and that of the thinned pigment dispersion for fine color matching "0.15× 40=6.0 ml" respectively. That is, the amounts of both the thinned pigment dispersions can be calculated in terms of the 1 ml unit, and the measuring accuracy is markedly improved. Further, the total mixing amount of both the thinned pigment dispersions is only 13 ml, and the solution for pigment dilution having the specific formulation is used. Consequently, the decrease in the performance of the base paint does not actually occur.

[Color Matching Device]

This pigment color matching method includes measuring, mixing and stirring steps. The mechanical devices used in these steps or the type of the color matching system is not particularly limited at all so far as they meet the needs.

However, it is preferable to include a measuring device capable of accurate measuring with two types of large and small measuring units on the weight or volume basis in view of the mechanism, for example, a specific piston pump-type measuring device.

In practicing the pigment color matching method, the amount of the thinned pigment dispersion for rough color matching and/or the thinned pigment dispersion for fine color matching is preferably conducted by the measurement on the volume basis (measurement of the thinned pigment dispersion using a volume scale) in the aspect of the working speed. However, the measurement on the weight basis (measurement of the thinned pigment dispersion by weight) is also available.

The color matching device is preferably a color matching device comprising means for measuring a thinned pigment dispersion for color matching in terms of a volume unit, means for charging a thinned pigment dispersion measured into a paint container containing a base paint in a standard weight and means for uniformly mixing the contents of the paint container by stirring.

In an especially preferable color matching device, a paint can which can be delivered or used as a paint container is used. After a thinned pigment dispersion for color matching is incorporated therein, the paint can is closed, and necessary movement is applied to the paint can itself to mix the contents of the paint container with stirring.

In these color matching devices, the paint can is used which can directly be delivered or used as the paint container. Therefore, it is very convenient to a user. Further, the contents are mixed with stirring by closing the paint can and applying the necessary movement to the paint can itself, so that the workability of the mixing with stirring is extremely good.

[Color Matching Data Base for User]

The color matching data base for user in the invention is a data base which is used in the color matching of the base paint by the user of the colored paint and in which at least the following data is offered for each desired color in the color matching:

(1) a standard amount of a base paint shown in terms of a weight unit or a volume unit; and (2) a mixing amount of a thinned pigment dispersion for color matching of one or more hues shown in terms of a weight unit or a volume unit relative to the base paint in the standard amount.

The following is an example of an advantageous method of using a color matching data base for user. When the standard amount of the base paint is shown in terms of the weight unit and the mixing amount of the thinned pigment dispersion or the mixing amounts of the thinned pigment dispersions for rough and fine color matching are shown in terms of the volume unit in the color matching data base for user, the data of the mixing amount of the thinned pigment dispersion or the data of the mixing amounts of the thinned pigment dispersions for rough and fine color matching are corrected, as required, by a correction formula in consideration of the change in the specific gravity of various thinned pigment dispersions owing to environmental factors, and the correction data is offered to the user as required.

The color matching data base for user according to the invention is used when the user of the colored paint himself conducts the color matching of the base paint. It includes at least a data of a standard amount of a base paint and a data of a mixing amount of a thinned pigment dispersion for color matching of one (in case of coloration with a single hue) or more (in case of coloration with two or more hues) hues relative to the base paint in the standard amount for each desired color in the color matching.

The data base may include any data other than the above-described data. The desired color of the color matching is shown by, for example, the corresponding number of a color sample for each unit data group in the color matching or by other means.

The data of the standard amount of the base paint and the data of the mixing amounts of the thinned pigment dispersions for color matching are shown in terms of a weight unit or a volume unit according to a measuring system in the color matching device that the user possesses. In the color matching device, it is most advantageous in view of the automatic color matching that the standard amount of the base paint which is used in a large amount is treated in a weight unit and the mixing amount of the thinned pigment dispersion which is used in a small amount is treated in a volume unit that can rapidly be measured.

Further, with respect to the data of the mixing amount of the thinned pigment dispersion for color matching of one or more hues, it is preferable that the thinned pigment dispersion for rough color matching having the high pigment concentration is shown in terms of a large measuring unit and the thinned pigment dispersion for fine color matching having the low pigment concentration is shown in terms of a measuring unit scaled up at a dilution ratio.

Still further, it is more preferable to measure the amounts of the thinned pigment dispersion for rough color matching and the thinned pigment dispersion for fine color matching using, for example, a measuring device capable of accurate measurement in two types of large and small measuring units as shown in examples to be described later. As a result, the simple, accurate measurement can be conducted easily.

[Data of a Mixing Amount of a Thinned Pigment Dispersion in Data Base]

The color matching of the base paint is conducted using, with respect to thinned pigment dispersions of any hues, a thinned pigment dispersion having one pigment concentration or a thinned pigment dispersion for rough color matching having a high pigment concentration and a thinned pigment dispersion for fine color matching having a low pigment concentration.

To comply with this, regarding the thinned pigment dispersion for color matching of one or more hues, the data of the mixing amount of the thinned pigment dispersion in the data base is offered as a data of a mixing amount of a thinned pigment dispersion for color matching having one pigment concentration or as a data of two mixing amounts of a thinned pigment dispersion for rough color matching having a high pigment concentration and a thinned pigment dispersion for fine color matching having a low pigment concentration. The latter data system is especially preferable.

In the latter data system, it is especially preferable that the data of the mixing amount of the thinned pigment dispersion for color matching comprises the data of a mixing amount of a thinned pigment dispersion for rough color matching shown by a large measuring unit in terms of a weight unit or a volume unit relative to a base paint in a standard amount and the data of a mixing amount of a thinned pigment dispersion for fine color matching shown by a measuring unit scaled up at a dilution ratio in terms of a weight unit or a volume unit relative to the base paint in the standard amount.

When a base paint is colored with a combination color of two or more hues, the data of the mixing amount of one or more thinned pigment dispersions is offered with respect to the thinned pigment dispersions for color matching of two or more hues.

By the way, when the thinned pigment dispersion for rough color matching having the high pigment concentration and the thinned pigment dispersion for fine color matching having the low pigment concentration are used, as described above, in the color matching of the base paint, the solution for pigment dilution developed by the present inventors can preferably be used for adjusting the amount of the latter though the dilution.

[Method of Offering the Data Base]

The method of offering the user the color matching data base for user according to the invention is not particularly limited.

However, one of the most effective offering methods is a method in which the data is offered to a user on-line with or without charge. The "on-line" here referred to includes offering through Internet, E-mail or a local area network (LAN) of a computer, and a 24-hour information offer service using a telephone set and a recording tape.

One of the other most effective offering methods is that a data in combination with a color sample is offered to a user. The "in combination" here referred to is, for example, offering of a data base book accompanied by a color sample, or offering of a color sample for each hue together with the data base through on-line or color facsimile communication so long as an accuracy of a hue can be secured.

[Correction of a Data Base]

It is advisable that the color matching data base for user according to the invention is corrected, as required, in consideration of the increase or the decrease in the volume of the thinned pigment dispersion owing to the environmental factors such as the seasonal change in the temperature when the standard amount of the base paint is shown in terms of a weight unit and the mixing amounts of the thinned pigment dispersions are shown in terms of a volume unit and that the results of correction are immediately offered to a user. The content of the correction formula for such a correction is not particularly limited so long as it is reasonable in consideration of the change in the specific gravity owing to the environmental factors. For example, the correction formula as will be described in Examples later can be used.

In this case, generally in the most advantageous mode of the automatic color matching using the color matching device in which a standard amount of a base paint used in a large amount is shown in terms of a weight unit and a mixing amount of a thinned pigment dispersion or mixing amounts of a thinned pigment dispersion for rough color matching and a thinned pigment dispersion for fine color matching used in small amounts are shown in terms of a volume unit, the color matching can be conducted easily and accurately by only correcting a color matching error accompanied by the increase or the decrease in the volume of the thinned pigment dispersion according to a corrected value of the color matching data base offered, as required, from the maker to the user.

By the way, in the correction of such a color matching data, the corrected value can be calculated by a user himself, but only a maker can accumulate and control a large volume of a data on which basis the corrected value is calculated. For a user to match a color accurately and easily along with calculation of a corrected value and correction of color matching without much care, it is most reasonable that a corrected value of a color matching data is offered from a maker to a user as required.

With respect to basic procedures for correcting a data on the basis of the correction formula, it is preferable to conduct the following two or three procedures.

a) The environmental conditions in the actual place of color matching are inputted.

b) The corrective calculation is conducted from the inputted conditions in a) and a basic data that a maker possesses.

c) These procedures are conducted on-line in real time.

A method of practicing the data correction and the color matching on this basis includes various methods, and it is not particularly limited. In one effective method, environmental conditions such as a temperature, a humidity and a weather in a position and at a time in which a user conducts the color matching are inputted in a user's on-line terminal computer; an on-line host computer (on the maker side) in turn automatically retrieves a basic data accumulated to automatically provide a data of the change in the specific gravity under the same environmental conditions; desired operation is conducted; and the correction data is returned to the user's terminal computer on-line in real time.

Further in another effective method, a user actually measures a volume weight (specific gravity) of each thinned pigment dispersion in a position and at a time for color matching (more preferably calculates an average value of plural measured values); the resulting value is inputted in a user's terminal computer; an on-line host computer in turn automatically conducts desired operation based on the correction formula; and a correction data is returned to a user's terminal computer on-line in real time.

[Relation Between a Data Base and a Correction Data]

The color matching data base for user comprises, as described above, the data of the standard amount of the base paint and the data of the mixing amount of the thinned pigment dispersion for color matching, more preferably the data of the standard amount of the base paint shown in terms of a weight unit and the data of the mixing amounts of the thinned pigment dispersions for rough color matching and for fine color matching shown in terms of a volume unit relative to the data of the base paint. In the preferred embodiment, the correction data in which the data of the mixing amount of the thinned pigment dispersion is offered by being corrected with the correction formula in consideration of the change in the specific gravity due to the environmental factors of the thinned pigment dispersion. Accordingly, the following embodiments are considered with respect to the data base and the correction data.

a) There is always the standard data base of the data of the standard amount of the base paint and the data of the thinned pigment dispersion for color matching. A user can use this as such or the data corrected on the mixing amount of the thinned pigment dispersion as described above when a more accurate data is required.

b) The standard data base is not offered to the user, but the data base is always offered only as a correction data.

c) With respect to the correction data of the mixing amounts of the thinned pigment dispersions for rough color matching and for fine color matching in a) and b), there are (c1) a system in which the data of the mixing amounts of the thinned pigment dispersions for rough color matching and for fine color matching in the standard data base are calculated by correction (in this system, the correction data of the mixing amounts of the thinned pigment dispersions for rough color matching and for fine color matching might be calculated with a minor measuring unit, for example, "4.15 ml", and this is not necessarily desirable), and (c2) a system in which the correction data of the mixing amount of the pigment dispersion is first obtained by correcting the data of the mixing amount of the pigment dispersion defined in the standard data base, and the correction data of the mixing amounts of the thinned pigment dispersions for rough color matching and for fine color matching is calculated from the above-described data (in this system, there is no need to include the data of the mixing amounts of the thinned pigment dispersions for rough color matching and for fine color matching in the standard data base.

EXAMPLES

Example 1

Formulation of a Solution for Pigment Dilution

A specific formulation of a solution for pigment dilution is described below. In this formulation, a thickener was hydroxyethyl cellulose, and a drying inhibitor was ethylene glycol (EG). As an antiseptic, "San-ai bac P" (trade name for a product of San-Ai Oil Co., Ltd.) was used. As a fungicide, "Coatcide SP" (trade name for a product of TAKEDA CHEMICAL INDUSTRIES, LTD.) was used.

| | |
|---|---|
| thickener | 0.5 to 5.0% by weight |
| drying inhibitor | 3.0 to 20.0% by weight |
| antiseptic | 0.1 to 1.0% by weight |
| fungicide | 0.1 to 1.0% by weight |
| water | 73.0 to 96.3% by weight |

Example 2

Formulation of a Thinned Pigment Dispersion Set for Color Matching

Formulations of black, yellow and rust-colored pigment dispersions as thinned pigment dispersions for rough color matching having a high pigment concentration, and a thinned pigment dispersion set for color matching obtained by diluting the same with the solution for pigment dilution are described below.

a) Formulation of a black pigment dispersion

| | |
|---|---|
| pigment (carbon black) | 30% by weight |
| water-soluble acrylic resin | 10% by weight |
| additive (main component is EG, a dispersing medium) | 20% by weight |
| water | 40% by weight | b) Formulation of a yellow pigment dispersion

| | |
|---|---|
| pigment (yellow iron oxide) | 42% by weight |
| water-soluble acrylic resin | 20% by weight |
| additive (main component is EG, a dispersing medium) | 14% by weight |
| water | 24% by weight |

-continued c) Formulation of a rust-colored pigment dispersion

| | |
|---|---|
| pigment(synthetic red iron oxide) | 57% by weight |
| extender pigment (silica) | 7% by weight |
| water-soluble acrylic resin | 12% by weight |
| additive (main component is EG, a dispersing medium) | 22% by weight |
| water | 2% by weight |

A thinned pigment dispersion set for color matching of black, yellow and rust hues was formed with the pigment dispersions(a), (b) and (c) of the respective hues and the thinned pigment dispersions having the low pigment concentration which were diluted to 20 times with the solution for pigment dilution in Example 1.

Example 3
Formulation of a Base Paint

The formulation of the base paint subjected to color matching is as follows. A defoamer, a dispersant and a wetting agent were selected from surfactants.

| | |
|---|---|
| synthetic resin emulsion (solid, content 50%) | 60% by weight |
| titanium oxide | 25% by weight |
| thickener | 0.5% by weight |
| film-forming aid | 5% by weight |
| antiseptic | 0.1% by weight |
| total of defoamer, dispersant and wetting agent | 0.5% by weight |
| water | 8.9% by weight |

Example 4

Color Matching Device

Example 4-1
Overall Structure of the Color Matching Device

The outline of the overall structure of the color matching device used in this Example is described by referring to FIG. 1. That is, an empty paint can 1 is first supplied to a color matching line, and a predetermined amount of the base paint is charged in a base paint charging portion 2. Subsequently, necessary amounts of a thinned pigment dispersion for rough color matching and a thinned pigment dispersion for fine color matching on a required hue are poured into this paint can 1 at a pigment measuring/mixing portion 3 from nozzles of plural piston pumps in a measuring device to be described later.

The necessary amounts of the thinned pigment dispersions have been determined by the color matching data base offered by a maker in, for example, an on-line terminal 4 and further preferably, by the color matching data already corrected. Thus, the necessary amounts of these thinned pigment dispersions are measured by being controlled artificially or automatically according to the same.

The paint can 1 charged with the thinned pigment dispersions in this manner is closed, and further undergoes a procedure of mixing by stirring with a stirrer to be described later in a mixing portion 5, whereby the contents are uniformly mixed to complete the color matching. The resulting product is directly used by a user, or delivered to a person who uses the same as a product that the user sells.

Example 4-2
Measuring Device Used

Figure 2:
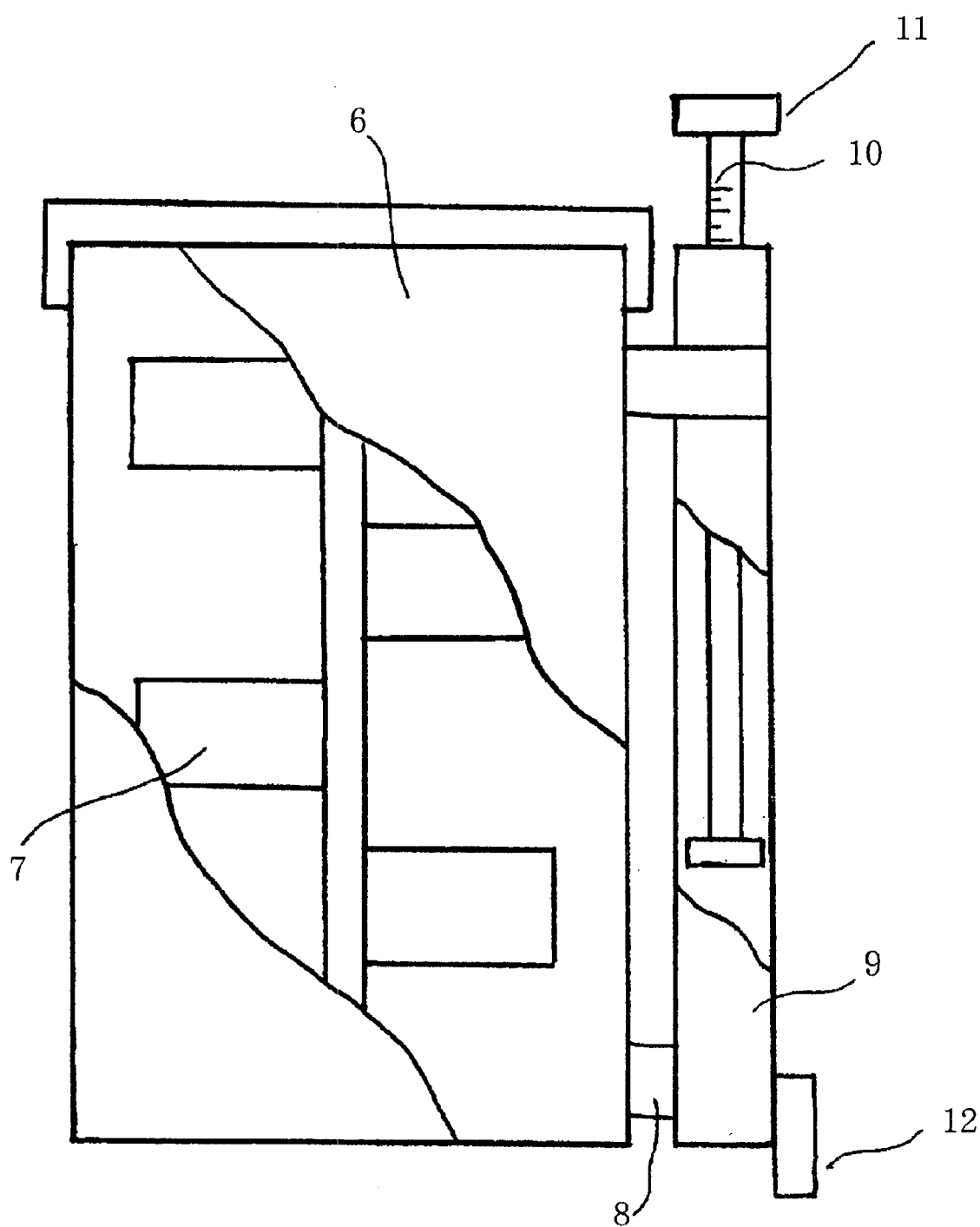
FIG. 2 is a partially cutaway view of a measuring device used in Examples.

In the pigment measuring/mixing portion 3, a measuring device shown in, for example, FIG. 2 is used to measure the amounts of the thinned pigment dispersion for rough color matching (pigment dispersion) and the thinned pigment dispersion for fine color matching to be mixed with the base paint.

That is, stirring blades 7 for periodically stirring solutions are mounted in a tank 6, and the thinned pigment dispersion is stored therein. The tank 6 is communicated with a piston pump 9 through a check valve 8. This piston pump 9 has a pump handle 11 fitted with a gauge 10 having a predetermined unit scale (a guide groove capable of positioning the pump handle is formed for each unit scale).

While the gauge 10 is set at the indicated scale, the pump handle 11 is lifted. Then, a predetermined amount of the thinned pigment dispersion is charged into the piston pump 9. Subsequently, when the pump handle 11 is pushed down, the check valve 8 actuates, whereby the predetermined amount of the thinned pigment dispersion is jetted from a nozzle 12 for mixing with a base paint.

In this measuring device, one tank 6 is actually fitted with a set of a large pump (gauge scale 5 ml, capable of measuring 10 to 150 ml) and a small pump (gauge scale 0.2 ml, capable of measuring 0.2 to 8 ml). Further, the tank 6 comprises a pair of a tank containing a thinned pigment dispersion for rough color matching and a tank containing a thinned pigment dispersion for fine color matching for each hue used.

Example 4-3
Function of a Measuring Device

When the color matching is conducted using the color matching device including the measuring device, the necessary amounts of the thinned pigment dispersion for rough color matching and the thinned pigment dispersion for fine color matching are first determined by measuring the amounts which are integral times the measuring unit peculiar to a large-volume pump through from one to several pump operations. Even when fractions are provided, the measurement of the fractional amounts can be completed through from one to several pump operations with the small measuring unit peculiar to a small-volume pump. Thus, the measurement can be conducted quite easily and accurately.

The amount of the thinned pigment dispersion for rough color matching is defined with a large measuring unit, and the amount of the thinned pigment dispersion for fine color matching with a measuring unit scaled up at a dilution ratio respectively. Accordingly, regarding both of the thinned pigment dispersions, the amounts of the thinned pigment dispersions and/or the amounts thereof to be charged in the large-volume pump are easily determined so as not to provide the fractions. Even when fractional amounts are provided, the supplementary measurement that does not further provide fractions can easily be conducted with the small-volume pump.

Specifically, in case the pigment concentration ratio of the thinned pigment dispersion for rough color matching and the thinned pigment dispersion for fine color matching is 40:1, it is sufficient that the amount of the thinned pigment dispersion for rough color matching is determined at "7.0 ml" and that of the thinned pigment dispersion for fine color matching at "0.15×40=6.0 ml" respectively. For example, when the amounts of both of the thinned pigment dispersions for rough color matching and for fine color matching to be charged in the large-volume pump are determined at 5 ml and those in the small-volume pump at 0.5 ml respectively, the following procedure is conducted. That is, when the large-volume pump is operated once and the small-volume pump four times on the thinned pigment dispersion for rough color matching, the amount "7.0 ml" is measured automatically and accurately. Further, when the large-volume pump is operated once and the small-volume pump twice on the thinned pigment dispersion for fine color matching, the amount "6.0 ml" is measured automatically and accurately.

Further, for example, the amount of the thinned pigment dispersion for rough color matching to be charged in the large-volume pump is set at 5 ml and the amount thereof charged in the small-volume pump at 2 ml, and the amount of the thinned pigment dispersion for fine color matching to be charged in the large-volume pump is set at 5 ml and the amount thereof charged in the small-volume pump at 1 ml respectively. As a result, in both of the thinned pigment dispersions for rough color matching and for fine color matching, the amount "7.0 ml" of the thinned pigment dispersion for rough color matching and the amount "6.0 ml" of the thinned pigment dispersion for fine color matching are measured automatically and accurately when the large-volume pump and the small-volume pump are operated once.

Examples 4-4

Mixer Used

In the mixing portion 5, for example, the following stirrer is used. That is, though not shown, the paint can 1 after closed is gripped with a clamp having a predetermined moving mechanism to provide longitudinal rotation A (in a longitudinal direction of the capped paint can) and transversal rotation B (a ratio of numbers of rotations is preferably that A is 1 whereas B is 2 or more) In this manner, the contents are uniformly mixed at high speed by stirring.

Such a mixer is called a gyro mixer [for example, "COROB.GCM gyro mixer" supplied by Corob S. R. L. (Italy)], and it is a known mixer.

Example 5

Color Matching Data Base

Example 5-1

Example of Offering a Data in a Data Base

An example of offering a data to a user is described. It is a standard data base mentioned in the above-described (a) under the title of [Relation between a data base and a correction data], and it shows a data of necessary mixing amounts of a thinned pigment dispersion for rough color matching and a thinned pigment dispersion for fine color matching for black, yellow and rust hues required for color matching of 16 kg of a predetermined base paint to N-80 color in a standard color sample book for paints published by The Japan Paint Manufacturers Association. A user can operate a color matching device as instructed by the very data or as instructed from the correction data obtained by correcting, as required, the very data as will be described later.

| Hue | Required amount of pigment dispersion | Color matching of thinned pigment dispersion | Measuring amount of large or small pump |
|---|---|---|---|
| black | 12.56 g | rough | large: 10.0 ml<br>small: 0.5 ml |
|  |  | fine | large: 0.0 ml<br>small: 3.0 ml |
| yellow | 13.44 g | rough | large: 5.0 ml |

-continued

| Hue | Required amount of pigment dispersion | Color matching of thinned pigment dispersion | Measuring amount of large or small pump |
|---|---|---|---|
|  |  | fine | small: 3.8 ml<br>large: 0.0 ml<br>small: 3.4 ml |
| rust | 4.72 g | rough | large: 0.0 ml<br>small: 2.6 ml |
|  |  | fine | large: 0.0 ml<br>small: 4.4 ml |

Example 5-2

Data of Change in Specific Gravity of Thinned Pigment Dispersion Due to Environmental Factors Only a part of the data of the change in the specific gravity (called "Dispenser Volume Data Table") as a basic data that Applicant collects for correction of the data of the data base is shown in FIGS. 3 and 4. In this data of the change in the specific gravity, correction coefficients ("corrected values" in FIGS. 3 and 4) of mixing amounts of pigment dispersions in the above-described system (c2) are calculated.

FIG. 3 shows values obtained by measuring amounts of thinned pigment dispersions in predetermined volumes at a certain time on May 26, 1998 (temperature: 18° C., humidity: 80%, weather: fine) with respect to a group of predetermined thinned pigment dispersions indicated at "black" to "yellow" in left column of FIG. 3, together with average values thereof and data correction coefficients based on the average values. FIG. 4 shows the same items with respect to a group of the same thinned pigment dispersions at a certain time on Aug. 25, 1998 (temperature: 24° C., humidity: 90%, weather: cloudy).

Incidentally, FIGS. 3 and 4 describe the data to adapt to the use of a piston pump-type measuring device. In FIGS. 3 and 4, "pigment dispersion" indicates a pigment dispersion used as a thinned pigment dispersion for rough color matching, and "dilute solution" a thinned pigment dispersion for fine color matching respectively. Further, the words "large" and "small" indicate "large pump" and "small pump", and "scale" means a scale of a gauge in a piston pump.

The comparison between FIG. 3 and FIG. 4 reveals that the data correction of the data base is required and advantageous for the accurate color matching of the base paint.

Example 5-3

Data Correction

An example of data correction in the data base is described below. First, with respect to each thinned pigment dispersion, a unit volume weight Pav. is calculated using the following formula (1). In the formula, V is ml of a thinned pigment dispersion, n is the number of measurements of the thinned pigment dispersion, and W is a measured value of the thinned pigment dispersion. Further, "ΣW" means a "total amount of plural W values".

$$Pav.=\Sigma W/nV \quad (1)$$

The thus-calculated Pav. corresponds to the "measured value" in FIGS. 3 and 4, and shows the value of change in the specific gravity, meaning the correction coefficient of the data.

Accordingly, when the original necessary amount of the thinned pigment dispersion [the thinned pigment dispersion for rough color matching and the thinned pigment dispersion for fine color matching in system (c1) and the pigment dispersion in system (c2)] is indicated on the weight basis in system (c1) and system (c2) in the data base, the necessary corrected value on the weight basis is obtained upon multiplying this by the Pav. value. Further, when the original necessary amount of the thinned pigment dispersion is indicated in terms of a volume, the necessary corrected value on the volume basis is obtained upon multiplying this by 1/Pav. =nV/ΣW which is an inverse number of the Pav. value.

Example 6
Color Matching of a Colored Paint According to a Correction Data

The foregoing correction was applied to the data of the data base in Example 5-1, and the color matching of the base paint was conducted on the basis of this correction data using a predetermined color matching equipment fitted with the above-described measuring device. The correction data is as follows.

| Hue | Required amount of pigment dispersion | Color matching of thinned pigment dispersion | Measuring amount of large or small pump |
| --- | --- | --- | --- |
| black | 12.56 g | rough | large: 10.0 ml<br>small: 0.6 ml |
|  |  | fine | large: 5.0 ml<br>small: 0.0 ml |
| yellow | 13.44 g | rough | large: 5.0 ml<br>small: 3.8 ml |
|  |  | fine | large: 0.0 ml<br>small: 2.4 ml |
| rust | 4.72 g | rough | large: 0.0 ml<br>small: 2.6 ml |
|  |  | fine | large: 0.0 ml<br>small: 2.8 ml |

As a result, the color could be matched accurately to N-80 color in a standard color sample book for paints published by The Japan Paint Manufacturers Association.

While the preferred examples have been described, variations thereto will occur to those skilled in the art with the scope of the present inventive concepts which are delineated by the following claims.

What is claimed is:

1. A user's color matching system in which a user of a colored paint himself matches a color of a base paint using a thinned pigment dispersion for color matching under the following conditions (1) to (3):
   (1) the user has a color matching device capable of conducting measuring and mixing for color matching;
   (2) the maker of the colored paint offers the user the base paint and the thinned pigment dispersion for color matching of a required hue, wherein the thinned pigment dispersion is offered as a thinned pigment dispersion set for color matching comprising a thinned pigment dispersion for rough color matching having a high pigment concentration and a thinned pigment dispersion for fine color matching having a low pigment concentration for each hue; and
   (3) the maker of the colored paint offers the user, in any mode, a color matching data base for user that indicates a standard amount of a base paint in color matching and a mixing amount of a thinned pigment dispersion for rough color matching and the thinned pigment dispersion for fine color matching for each hue.

2. The user's color matching system as claimed in claim 1, wherein the thinned pigment dispersion for fine color matching and the thinned pigment dispersion for rough color matching having a lower pigment concentration than the pigment dispersion are obtained by diluting the pigment dispersion with a colorless transparent solution for pigment dilution containing at least one of HEC (hydroxyethyl cellulose), a polycarboxylate and xanthan gum as a thickener and an alkylene glycol as a drying inhibitor.

3. The user's color matching system as claimed in claim 1, wherein the data of the mixing amount of the thinned pigment dispersion for color matching of one or more hues in the color matching data base for user comprises a data of a mixing amount of the thinned pigment dispersion for rough color matching indicated by a large measuring unit in terms of a weight unit or a volume unit and a data of a mixing amount of the thinned pigment dispersion for fine color matching indicated by a measuring unit scaled up at a dilution ratio in terms of a weight unit or a volume unit, and the color matching of the base paint with the color matching device is conducted through the rough color matching with the thinned pigment dispersion for rough color matching and the fine color matching with the thinned pigment dispersion for fine color matching according to these data.

4. The user's color matching system as claimed in claim 1, wherein the color matching data base for user is offered to the user on-line or in combination with a color sample.

5. The user's color matching system as claimed in claim 1, wherein the standard amount of the base paint in the color matching data base for user is indicated by a weight unit, and the mixing amount of the thinned pigment dispersion or the mixing amounts of the thinned pigment dispersion for rough color matching and the thinned pigment dispersion for fine color matching constituting the thinned pigment dispersion set for color matching are indicated by a volume unit, and the data of the mixing amounts of the thinned pigment dispersions are offered to the user, as required, by being corrected with a correction formula in consideration of the change in the specific gravity owing to environmental factors of the thinned pigment dispersions.

6. A thinned pigment dispersion set for color matching which is offered from a maker of a thinned pigment dispersion to a user having a measuring device capable of accurate measurement in large and small two measuring units and which is used for the user to conduct color matching of a paint of any hue with the measuring device, said thinned pigment dispersion set comprising
   a pigment dispersion produced for color matching of the base paint, or a thinned pigment dispersion for rough color matching having a high pigment concentration, which is obtained by diluting the pigment dispersion at a relatively low ratio with a colorless transparent solution for pigment dilution containing at least one of HEC (hydroxyethyl cellulose), a polycarboxylate and xanthan gum as a thickener and an alkylene glycol as a drying inhibitor and which is used for rough color matching of the base paint in a large measuring unit in the measuring device, and
   a thinned pigment dispersion for fine color matching having a low pigment concentration, which is obtained by diluting the pigment dispersion at a relatively high ratio, a known dilution ratio relative to the thinned pigment dispersion for rough color matching with said solution for pigment dilution and which is used for fine color matching of the base paint subjected to the rough color matching in a measuring unit scaled up at the known dilution ratio, and the pigment concentration ratio, known to the user, of the thinned pigment dispersion for rough color matching having the high pigment concentration and the thinned pigment dispersion for fine color matching having the low pigment concentration being in the range of from 5:1 to 50:1.

7. A paint color matching method for a user of a colored paint having a measuring device capable of accurate measurement in large and small two measuring units to conduct the color matching of a thinned pigment dispersion of any hue using said measuring unit, wherein with respect to a thinned pigment dispersion of one or more hues, a base paint is subjected to rough color matching using the thinned pigment dispersion for rough color matching as claimed in claim 6 in a large measuring unit in the measuring device, and the base paint which has undergone the rough color matching is subjected to fine color matching using the thinned pigment dispersion for fine color matching as claimed in claim 6 in a measuring unit scaled up at a known dilution ratio.

8. The user's color matching system as claimed in claim 1, wherein the color matching data base provides the following data for each desired color in the color matching:

(1) a standard amount of a base paint shown in terms of a weight unit or a volume unit; and (2) a mixing amount of a thinned pigment dispersion for color matching of one or more hues shown in terms of a weight unit or a volume unit relative to the base paint in the standard amount.

9. The user's color matching system as claimed in claim 8, wherein the data of the mixing amount of the thinned pigment dispersion for color matching of one or more hues comprises the following two types of data:

(2a) a mixing amount of a thinned pigment dispersion for rough color matching having a high pigment concentration indicated by a large measuring unit in terms of a weight unit or a volume unit relative to the base paint in the standard amount; and (2b) a mixing amount of a thinned pigment dispersion for fine color matching having a low pigment concentration indicated by a measuring unit scaled up at a dilution ratio in terms of a weight unit or a volume unit relative to the base paint in the standard amount.

10. The user's color matching system as claimed in claim 8, which is offered to the user on-line.

11. The user's color matching system as claimed in claim 8, which is offered to the user in combination with a color sample.

12. The user's color matching system as claimed in claim 8, wherein in the color matching data base for user, the standard amount of the base paint is shown in terms of the weight unit and the mixing amount of the thinned pigment dispersion or the mixing amounts of the thinned pigment dispersion for rough color matching and the thinned pigment dispersion for fine color matching are shown in terms of the volume unit, the data of the mixing amount of the thinned pigment dispersion or the data of the mixing amounts of the thinned pigment dispersion for rough color matching and the thinned pigment dispersion for fine color matching are corrected, as required, by a correction formula in consideration of the change in the specific gravity of various thinned pigment dispersions owing to environmental factors, and the correction data is offered to the user as required.

* * * * *